(12) United States Patent
Feistel (10) Patent No.: US 10,359,116 B2
(45) Date of Patent: Jul. 23, 2019

(54) DRY-RUNNING PISTON ROD PACKING AND METHOD FOR OPERATING A DRY-RUNNING PISTON ROD PACKING

(71) Applicant: BURCKHARDT COMPRESSION AG, Winterthur (CH)

(72) Inventor: Norbert Feistel, Ellikon a.d. Thur (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 15/778,870

(22) PCT Filed: Nov. 30, 2016

(86) PCT No.: PCT/EP2016/079341
§ 371 (c)(1),
(2) Date: May 24, 2018

(87) PCT Pub. No.: WO2017/093355
PCT Pub. Date: Jun. 8, 2017

(65) Prior Publication Data
US 2018/0355978 A1 Dec. 13, 2018

(30) Foreign Application Priority Data
Nov. 30, 2015 (EP) ..................... 15196957

(51) Int. Cl.
*F16J 15/26* (2006.01)
*F16J 15/44* (2006.01)
(Continued)

(52) U.S. Cl.
CPC ........... *F16J 15/441* (2013.01); *F16J 15/006* (2013.01); *F16J 15/56* (2013.01)

(58) Field of Classification Search
CPC .......... F16J 15/44; F16J 15/445; F16J 15/346; F16J 15/26; F16J 15/28; F16J 15/184;
(Continued)

(56) References Cited

U.S. PATENT DOCUMENTS 2,914,348 A * 11/1959 Kroekel ................... F16J 15/26
277/548
4,643,437 A 2/1987 Salant et al.
(Continued)

FOREIGN PATENT DOCUMENTS

DE           8523784       10/1985
DE    102010033647 A1   2/2012
(Continued)

OTHER PUBLICATIONS

International Search Report and English Translation for PCT/EP2016/079341, Completed by the European Patent Office dated Mar. 15, 2017, 6 Pages.

*Primary Examiner* — Gilbert Y Lee
(74) *Attorney, Agent, or Firm* — Brooks Kushman P.C.

(57) ABSTRACT

The dry-running piston rod packing for sealing a piston rod supported in such a way that the piston rod can be moved in a longitudinal direction (L) having at least one chamber ring, a sealing chamber, and a sealing ring arranged in the sealing chamber, wherein the piston rod packing has a high-pressure side and a low-pressure side, wherein a lift-off device is designed and arranged in such a way that the lift-off device can lift and lower the sealing ring in the longitudinal direction (L).

14 Claims, 4 Drawing Sheets

(51) Int. Cl.
*F16J 15/00* (2006.01)
*F16J 15/56* (2006.01)

(58) Field of Classification Search
CPC .......... F16J 15/186; F16J 15/43; F16J 15/441; F16J 15/006; F16J 15/56
See application file for complete search history.

(56) References Cited

U.S. PATENT DOCUMENTS

| | | | |
|---|---|---|---|
| 7,815,193 | B2 | 10/2010 | Feistel et al. |
| 9,121,299 | B2 * | 9/2015 | Giametta ................ F01D 11/08 |
| 2002/0167132 | A1 | 11/2002 | Care |
| 2010/0072706 | A1 * | 3/2010 | Schmitz ............... F16J 15/3436 277/301 |
| 2012/0014778 | A1 * | 1/2012 | Narita ..................... F01D 11/06 415/1 |
| 2014/0035238 | A1 | 2/2014 | Richie et al. |
| 2016/0298768 | A1 | 10/2016 | De Lapersonne et al. |

FOREIGN PATENT DOCUMENTS

| | | |
|---|---|---|
| WO | 2006042866 | 4/2006 |
| WO | 2015082497 | 6/2015 |

\* cited by examiner

DRY-RUNNING PISTON ROD PACKING AND METHOD FOR OPERATING A DRY-RUNNING PISTON ROD PACKING

CROSS-REFERENCE TO RELATED APPLICATION

This application is the U.S. national phase of PCT Application No. PCT/EP2016/079341 filed on Nov. 30, 2016, which claims priority to EP Patent Application No. 15196957.3 filed on Nov. 30, 2015, the disclosures of which are incorporated in their entirety by reference herein.

The invention concerns a dry-running piston rod packing according to the preamble of claim 1. The invention also concerns a method for operating a dry-running piston rod packing according to the preamble of claim 9.

Dry-running piston compressors are compressors which, in the compression part, work without external lubricant such as for example lubricating oil. The compression chamber must here be sealed as well as possible against its environment, in order to prevent an undesirable outflow of the medium to be compressed or at least reduce this to a minimum. Critical points relative to the seal are in particular the region in which the piston rod passes into the cylinder interior, wherein this passage is also designated the piston rod packing.

In dry-running compressors in particular, sealing elements, such as for example sealing rings for sealing the piston rod, are subjected to extremely high mechanical and thermal loads. As well as good tribological properties, such sealing elements must also retain their sealing properties at high temperatures and at high pressure differences.

In particular for sealing the piston rods in dry-running piston compressors, sealing elements today are often made of plastic, for example filled polymers or high-temperature polymers. The polymer material used is for example polytetrafluoroethylene (PTFE), polyether ether ketone (PEEK), polyimide (PI) or polyamide imide (PAI). These polymers are normally mixed with fillers such as carbon, graphite, glass fibers, metals, ceramics or solid lubricants, and in this form are known as filled polymers.

Publication WO2006042866A1 describes a dry-running piston rod packing for a piston compressor having a piston rod which is movable longitudinally. This piston rod packing comprises at least one sealing ring and at least one actuator, wherein the actuator acts on the sealing ring and can displace this radially relative to the piston. In this way, the width of the gap between the sealing ring and the piston rod can be varied in a controlled fashion. This arrangement, known in itself, has the disadvantage that it is relatively complex, and the sealing ring is subject to partially greater wear.

Publication WO2015082497A1 describes a dry-running piston rod packing for a piston compressor having a piston rod which is movable longitudinally. This piston rod packing comprises at least one sealing ring and at least one actuator, wherein the actuator can exert on the sealing ring a force running axially to the piston rod. This arrangement has the disadvantage that displacement of the sealing ring radial to the piston rod is difficult because of the forces acting thereon.

It is therefore the object of the present invention to propose a more advantageous dry-running piston rod packing and a more advantageous method for operating a dry-running piston rod packing.

This object is achieved with the dry-running piston rod packing having the features of claim 1. Subclaims 2 to 8 concern further advantageous embodiments of the piston rod packing. The object is furthermore achieved with a method having the features of claim 9. Subclaims 10 to 14 concern further advantageous method steps.

In particular, the object is achieved with a dry-running piston rod packing for sealing a piston rod which is mounted so as to be moveable in a longitudinal direction, comprising at least one chamber ring and a sealing ring, wherein the chamber ring has a sealing chamber within which the sealing ring is arranged, wherein the piston rod packing has a high-pressure side and a low-pressure side, wherein the sealing chamber has a support face oriented towards the high-pressure side and delimiting the sealing chamber against the low-pressure side, wherein the sealing ring in the radial direction has an inside and an outside, and wherein the sealing ring has a first and a second end face, wherein the first end face is oriented towards the high-pressure side and forms a pressure application face, and wherein the second end face is oriented towards the low-pressure side and forms a contact face so that a sealing ring standing under pressure lies with the contact face against the support face, wherein an active lift-off device is configured such that it lifts a sealing ring lying against the support face in the longitudinal direction towards the high-pressure side, in order to form an intermediate gap between the support face and the contact face of the sealing ring.

The object is furthermore achieved in particular with a method for operating a dry-running piston rod packing for sealing a piston rod which is mounted so as to be moveable in a longitudinal direction, wherein the piston rod packing comprises at least one chamber ring and a sealing ring, wherein the chamber ring has a sealing chamber within which the sealing ring is arranged, wherein the piston rod packing surrounds the piston rod, wherein the piston rod packing has a high-pressure side and a low-pressure side in relation to a working gas, wherein the sealing chamber has a support face oriented towards the high-pressure side and delimiting the sealing chamber against the low-pressure side, wherein the sealing ring in the radial direction has an inside and an outside, and wherein the sealing ring has a first and a second end face, wherein the first end face is oriented towards the high-pressure side and forms a pressure application face for the working gas, and wherein the second end face is oriented towards the low-pressure side and forms a contact face, so that the sealing ring is pressed with the contact face against the support face in normal operation and lies against this, and wherein the sealing ring lying against the support face for centering is first moved by an active lift-off device in the longitudinal direction towards the high-pressure side and thus lifted away from the support face, so that an intermediate gap is formed between the support face and the contact face of the sealing ring, into which gap the working gas penetrates from the high-pressure side, so that the contact pressure force of the sealing ring in the longitudinal direction is reduced in order thus to reduce the friction force to be overcome in order to move the sealing ring in the radial direction relative to the longitudinal direction, and that after it has been lifted, the sealing ring is displaced in the radial direction.

In an advantageous embodiment, the sealing ring is configured as an endless sealing ring. Such an endless sealing ring can be centered relative to the piston rod particularly easily. The sealing ring may however also be configured multipiece, and in particular comprise a plurality, preferably three, segments which are arranged in the circumferential direction and are displaceable relative to each other at least in the radial direction.

The dry-running piston rod packing according to the invention has the advantage that this can seal particularly well a piston rod which is mounted movably in the longitudinal direction, with low wear and hence reliably for a long period. The piston rod packing comprises at least one chamber ring with a sealing chamber, and preferably a plurality of chamber rings with sealing chambers arranged successively in the longitudinal direction, wherein a sealing ring, preferably an endless sealing ring, is arranged in each sealing chamber and surrounds the piston rod. The sealing ring has a second end face which is oriented towards the low-pressure side of the piston rod packing, wherein usually at least a static pressure acts on the sealing ring so that this is pressed via the second end face against a support surface, wherein the support surface delimits the sealing chamber. The piston rod packing according to the invention comprises a lift-off device which lifts the sealing ring in the running direction of the piston rod, so that an intermediate gap is formed between the support surface and the second end face. As a result, the static friction of the sealing ring, which must be overcome in order to move the sealing ring in the radial direction, is reduced. The piston rod packing according to the invention thus has, inter alia, the advantages that firstly, the sealing ring can be moved in the radial direction with lower force, and secondly, on displacement of the sealing ring in the radial direction, a substantially reduced wear or even no wear occurs. In a particularly advantageous embodiment, in raised state, the sealing ring is automatically centered relative to the piston rod by the pressure forces acting thereon. The sealing ring is advantageously centered such that it does not touch the piston rod, so that no wear occurs either on the piston rod or on the sealing face of the sealing ring oriented towards the piston rod. The possibility of easily displacing the sealing ring in the radial direction also brings the advantage that the sealing gap between the piston rod and the sealing face of the sealing ring oriented towards the piston rod may be kept very small, since the position of the sealing ring relative to the piston rod can be changed or adjusted.

In an advantageous method, the sealing ring is regularly centered relative to the piston rod. Centering preferably takes place during the suction movement of the piston rod. In a particularly advantageous method, the sealing ring is lifted by the lift-off device during each suction movement of the piston rod, i.e. once per 360° revolution of the crankshaft, and centered relative to the piston rod preferably automatically by the pressure forces of the working gas acting on the sealing ring. However, it may also prove advantageous to provide at least one additional radial actuator which acts mechanically on the sealing ring in order to center this in the radial direction in the raised state.

The piston rod packing according to the invention therefore has the advantage that the sealing ring has no wear or only very slight wear, so that the piston rod packing may be operated maintenance-free for a longer operating period. The piston rod packing according to the invention has the further advantage that the sealing gap between the piston rod and the sealing ring can be kept very small without wear occurring. This small sealing gap has the advantage that the piston rod packing according to the invention can also reliably seal under higher pressures, or that fewer sealing rings are necessary for sealing.

The lift-off device is preferably configured as an electro-mechanical device or as a mechanical device, in particular comprising piezo crystals. In an advantageous embodiment, the piston rod packing according to the invention comprises at least one sensor for detecting the position of the sealing ring relative to the piston rod. This sensor may for example be configured as a distance sensor for measuring the distance between the surface of the piston rod and the sealing face of the sealing ring. The sensor could for example also be configured as a temperature sensor which detects the temperature of the sealing ring or piston rod, in order to detect the temperature rise which occurs on a mutual contact between the sealing ring and the piston rod.

The invention is explained below with reference to the attached figures. The exemplary embodiments shown do not constitute a restriction to the variants depicted, but serve merely to explain a principle of the invention. The same or similar components carry the same reference signs. In order to illustrate the function according to the invention, simplified principle depictions are shown in the figures, in which many elements of a piston rod packing have been omitted for greater clarity. This does not however mean that such components are not present in a solution according to the invention.

Figure 1:
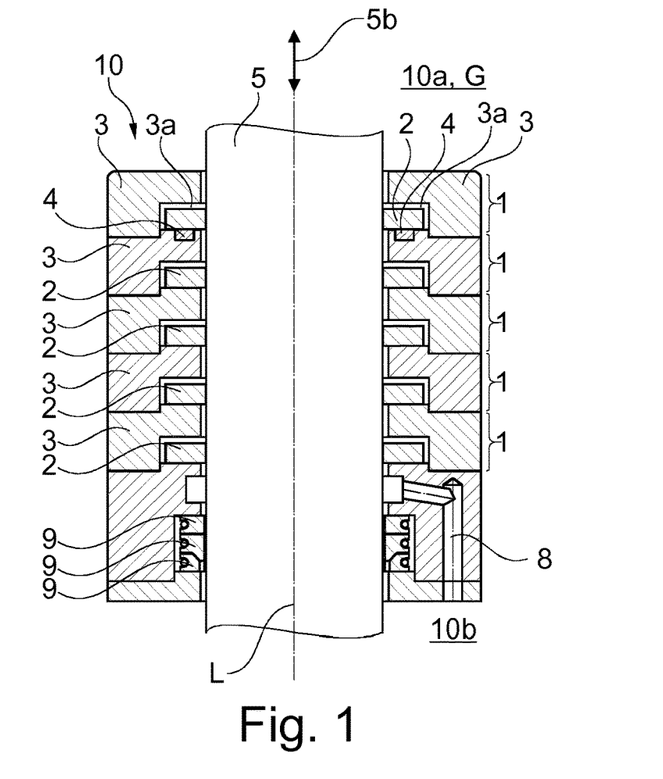
FIG. 1 a piston rod packing and a dry-running piston rod arranged therein.

FIG. 1 shows a longitudinal section through a dry-running piston rod packing 10 for sealing a piston rod 5, which runs through the piston rod packing 10 and is mounted so as to be movable in a longitudinal direction L or in the movement direction 5b. A piston rod packing 10 comprises at least one chamber ring 3, a sealing chamber 3a and an endless sealing ring 2 arranged in the sealing chamber 3a, wherein the chamber ring 3 with the sealing chamber 3a and the sealing ring 2 form a sealing arrangement 1. In at least one of the sealing chambers 3a or in each sealing chamber 3a, several sealing rings 2, for example two or three sealing rings, could be arranged successively in the longitudinal direction L and in mutual contact. The piston rod packing 10 has a high-pressure side 10a and a low-pressure side 10b in relation to a working gas G to be compressed. The exemplary embodiment of the piston rod packing 10 shown in FIG. 1 comprises five sealing arrangements 1 arranged successively in the longitudinal direction L, so that the piston rod 5 is surrounded by five sealing rings 2 which seal the piston rod 5. The sealing rings 2 seal the pressure difference between the high-pressure side 10a (the cylinder) and the low-pressure side 10b (the crankcase). Any leakage occurring is dissipated via a leakage gas line 8, and a leakage gas seal 9 at least partially prevents the gas from passing in the direction of the crankcase.

Figure 2:
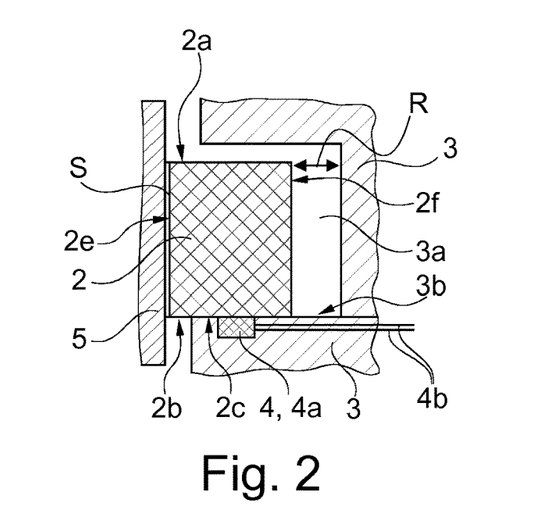
FIG. 2 a partial view of a longitudinal section of a sealing arrangement during normal operation.
Figure 4:
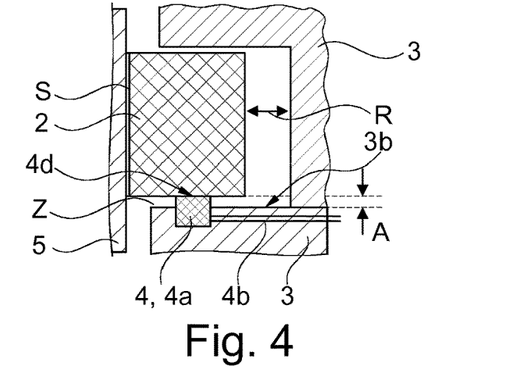
FIG. 4 a partial view of a longitudinal section of a sealing arrangement during displacement of the sealing ring.

FIG. 2 shows in detail a partial view of the longitudinal section shown in FIG. 1. The sealing chamber 3a has a support face 3b oriented towards the high-pressure side 10a and delimiting the sealing chamber 3a against the low-pressure side 10b. The sealing ring 2 in the radial direction has an inside 2e oriented towards the piston rod 5, and an outside 2f radially on the outside. A gap S is formed between the inside 2e and the surface of the piston rod 5. The sealing ring 2 has a first and a second end face 2a, 2b, wherein the first end face 2a is oriented towards the high-pressure side 10a and forms a pressure application face, and wherein the second end face 2b is oriented towards the low-pressure side 10b and forms a contact face 2c, so that a sealing ring 2 standing under pressure lies with the contact face 2c against the support face 3b. A lift-off device 4 comprising an actuator 4a is configured such that this can lift the sealing ring 2 lying against the support face 3b in the longitudinal direction L, in order to form temporarily an intermediate gap Z between the support face 3b and the contact face 2c, so that the working gas G can penetrate into the gap Z and hence the pressure forces acting on sealing ring 2 are changed. FIG. 4 shows the sealing ring 2 in raised state, with formed intermediate gap Z, wherein the sealing ring 2 is raised by the lift-off device 4 through a lifting distance A, wherein the maximum lifting distance A is preferably less than 1 mm, advantageously less than 0.1 mm, and particularly advantageously only a few microns, lying for example in the range between 0.01 mm and 0.1 mm. In the exemplary embodiment according to FIGS. 2 and 4, the lift-off device 4 comprises a piezo-electric actuator 4a which has a pusher face 4d. In activated state, the pusher face 4d, as shown in FIG. 4, protrudes above the support face 3b and thus lifts sealing ring 2. Otherwise, in an unactivated state, i.e. in the passive state, the piezo electric actuator 4a is preferably arranged inside the chamber ring 3 such that the pusher face 4d does not protrude above the support face 3b, in that the pusher face 4d comes to lie either at the same level as the support face 3b or the pusher face 4d comes to lie lower than the support face 3b. In unactivated state of the actuator 4a, the sealing ring 2 lies on the support face 3b because of the pressure in the sealing chamber 3a.

During operation of the piston compressor, at least two different pressure states may occur at the sealing ring 2. During a suction movement of the piston ring 5, a preferably substantially constant suction pressure is applied at the sealing ring 2. During a compression movement of the piston rod 5, a compression pressure is applied at the sealing ring. In one possible exemplary embodiment, the pressure on the low-pressure side 10b is ambient pressure, i.e. 1 bar, while the pressure on the high-pressure side 10a during the suction movement is a suction pressure of 40 bar, and during the compression movement this pressure rises to a compression pressure of up to 100 bar.

Figure 3:
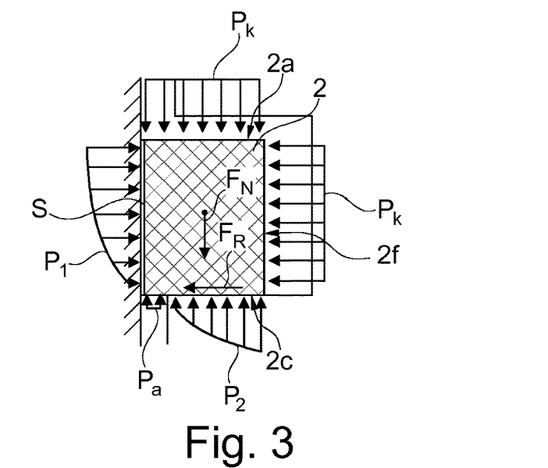
FIG. 3 the view according to FIG. 2, wherein the applied pressure is shown.

FIG. 3 shows the view according to FIG. 2, wherein a constant suction pressure is applied at the sealing chamber 3a or at the sealing ring 2, wherein the different pressures acting on the sealing ring 2 are depicted in detail. A chamber pressure $P_k$ acts on both the first end face 2a and on the outside 2f of the sealing ring 2. Along the gap S, a gap pressure $P_1$ is depicted which diminishes in the longitudinal direction L of the piston rod 5. Along the contact face 2c, a contact pressure $P_2$ is depicted which diminishes in the radial direction. At the outlet from the chamber 3a, the outlet pressure $P_a$ is present. The radial force $F_R$ necessary for displacing the piston ring 2 in the radial direction is equal to the friction coefficient μ multiplied by the contact pressure force $F_N$.

Figure 5:
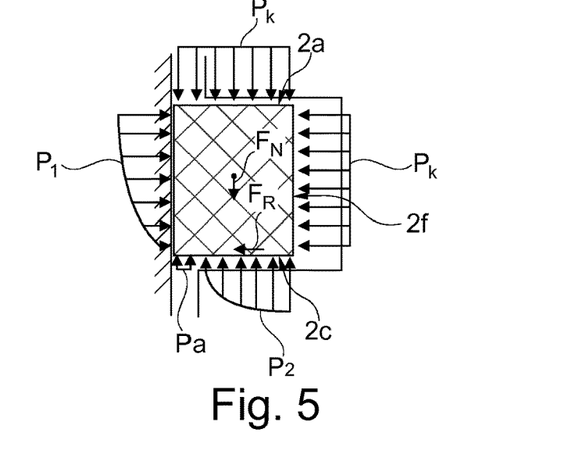
FIG. 5 the view according to FIG. 4, wherein the applied pressure is shown.

FIG. 5 shows the view according to FIG. 4 with the sealing ring 2 raised, wherein a constant suction pressure is applied at the sealing ring 2, and wherein the different pressures acting on the sealing ring 2 are depicted in detail. The chamber pressure $P_K$ acts on both the first end face 2a and on the outside 2f of the sealing ring 2. Along the gap S, a gap pressure $P_1$ is depicted which diminishes in the longitudinal direction L of the piston rod 5. Along the contact face 2c, a contact pressure $P_2$ is depicted which diminishes slightly in the radial direction. At the outlet from the chamber 3a, the outlet pressure $P_a$ is present. The lifting of the sealing ring 2 or the resulting intermediate gap Z leads to a slightly diminishing contact pressure $P_2$, which reduces the contact pressure force $F_N$ of the sealing ring 2 acting on the support face 3b, which in turn reduces the force $F_R$ necessary for the radial displacement of the sealing ring, wherein the radial force $F_R$ is equal to the friction coefficient μ multiplied by the contact pressure force $F_N$. A comparison of FIGS. 3 and 5 shows that in FIG. 5, the contact pressure force $F_N$ and hence also the force $F_R$ is substantially reduced.

With reference to FIGS. 3 and 5, the method is explained for operating the dry-running piston rod packing 10 for sealing a piston rod 5 which is mounted so as to be movable in the longitudinal direction L. During normal operation, i.e. during a suction movement during which the substantially constant suction pressure is present at the piston rod seal 10, the sealing ring 2 with the contact surface 2c is pressed against the support surface 3b. To center the sealing ring 2, the sealing ring 2 is first moved by the pusher face 4d of the lift-off device 4 in the longitudinal direction L and hence lifted off the support face 3b, so that an intermediate gap Z is created between the support face 3b and the contact face 2c of the sealing ring 2, in order thus to reduce the friction force $F_R$ which must be overcome in order to move the sealing ring 2 in the radial direction R relative to the longitudinal direction L. After the sealing ring 2 has been lifted, if it is arranged eccentrically relative to the piston rod 5, the sealing ring 2 is moved in the radial direction R and centered preferably automatically because of the sum of all pressure forces acting on the sealing ring 2.

Figure 9:
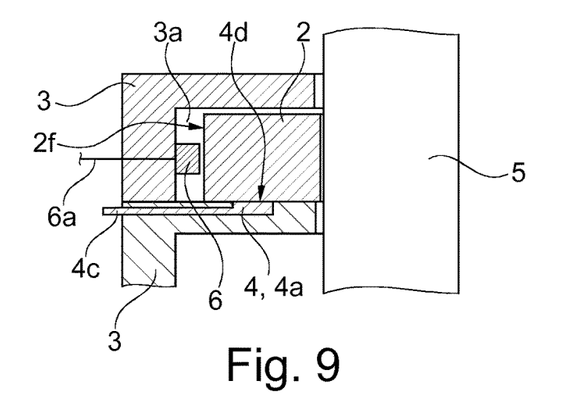
FIG. 9 a further exemplary embodiment of a piston rod packing.
Figure 11:
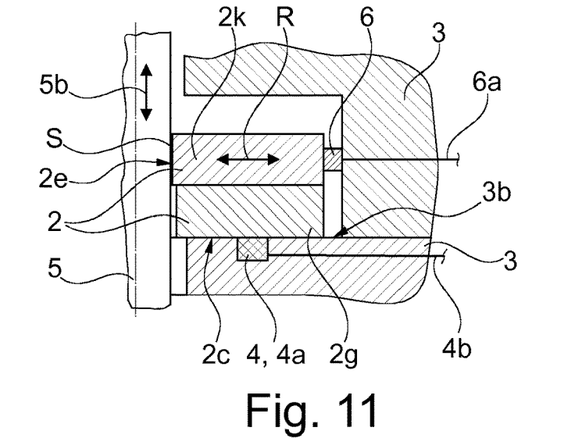
FIG. 11 an exemplary embodiment of a piston rod packing with a multipiece sealing ring.

Advantageously, the sealing ring 2 is both raised and lowered again by the lift-off device 4 during a suction movement of the piston rod 5. Advantageously, in raised state, the sealing ring 2 is automatically centered by the radial forces acting thereon. It may however also prove advantageous to center the sealing ring 2 in raised state by a radial actuator 6 acting on the sealing ring 2, for example by a mechanically acting radial actuator 6, as shown in FIG. 9 or 11. In an advantageous method, the sealing ring 2 is lifted and lowered once during one complete reciprocating movement of the piston rod 5. This method has the advantage that the sealing ring 2 may be centered afresh relative to the piston rod 5 during each 360° revolution of the crankshaft, so that a mutual contact between the sealing ring 2 and the piston rod 5 can be largely—and advantageously completely—avoided. It may also prove advantageous to arrange at least one sensor which detects the position of the sealing ring 2 relative to the surface of the piston rod 5. In an advantageous method, the sealing ring 2 is raised in the longitudinal direction L and then displaced in the radial direction only if, for example, the distance between the piston rod 5 and the inside 2e of the sealing ring 2 deviates from a predefined nominal distance value. Such a method allows, for example, the number of liftings of the sealing ring 2 over time to be minimized. In an advantageous embodiment, a lift-off device 4 is provided for each sealing ring 2 of the piston rod packing 10. In a possible method, all lift-off devices 4 are raised and lowered again during a suction movement, preferably in mutual synchrony. In a further advantageous method, for example, only those lift-off devices 4 are activated whose assigned sealing rings 2 deviate for example from a predefined nominal distance value.

Figure 6:
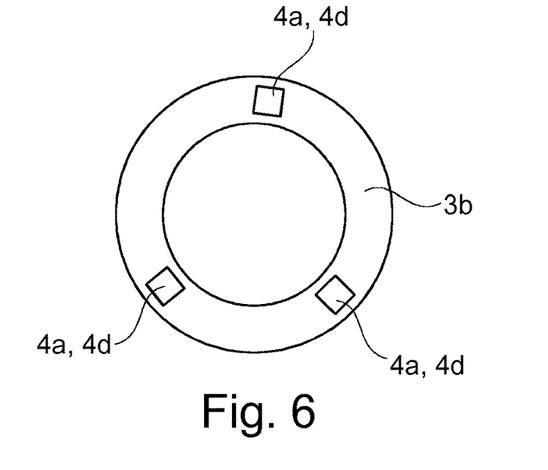
FIG. 6 a top view of a chamber ring.

FIG. 6 shows a top view of the support face 3b shown in FIG. 4. Three lift-off devices 4, with actuators 4a and pusher faces 4d which act on the sealing ring 2, are arranged in the chamber ring 3, spaced apart in the circumferential direction. For each chamber ring 3, at least two actuators 4a are provided, which are mutually spaced in the circumferential direction by 180°, and preferably three actuators 4a which, particularly advantageously, are arranged evenly mutually spaced by 120° in the circumferential direction.

Figure 7:
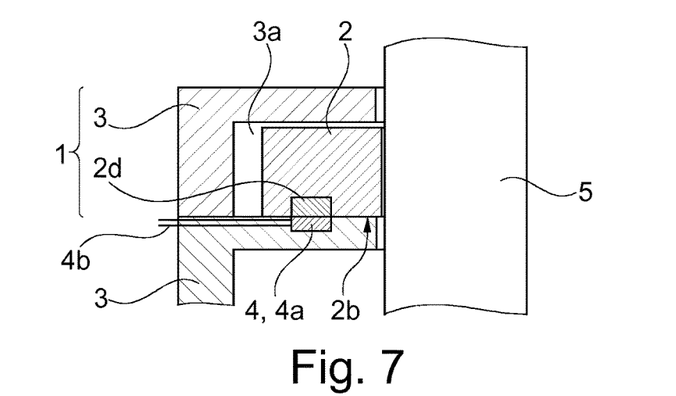
FIG. 7 a further exemplary embodiment of a piston rod packing.
Figure 8:
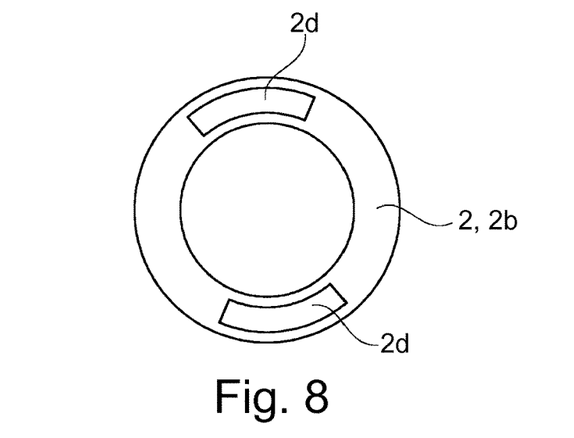
FIG. 8 a top view of the sealing ring according to FIG. 7.

FIG. 7 shows a partial view of a longitudinal section of a further piston rod packing 10. In contrast to the lift-off device shown in FIG. 2, the lift-off device 4 shown in FIG. 7 comprises a permanent magnet 2d and an electromagnet 4a, wherein the permanent magnet 2d is arranged in the sealing ring 2 and the electromagnet 4a is arranged in the chamber ring 3, wherein the permanent magnet 2d and the electromagnet 4a are arranged lying opposite each other in the longitudinal direction L. Activation of the electromagnet 4a causes a repelling of the permanent magnet 2d and hence a lifting of the sealing ring 2. FIG. 8 shows a top view of the second end face 2b of the sealing ring 2, with two permanent magnets 2d arranged spaced apart in the circumferential direction.

FIG. 9 shows a partial view of a longitudinal section through a further piston rod packing 10. In contrast to the lift-off device shown in FIG. 7, the lift-off device 4 shown in FIG. 9 comprises an e.g. completely mechanical arrangement, comprising for example a pull rod 4c, wherein an articulated joint is arranged in the actuator 4a in order to lift and lower the pusher face 4d. Advantageously, a radial actuator 6 with control line 6a is also provided, which is configured such that this acts on the outside 2f of the sealing ring 2 and displaces the sealing ring 2 in the radial direction R. Advantageously, a plurality of radial actuators 6 is provided which are spaced apart in the circumferential direction.

Figure 10:
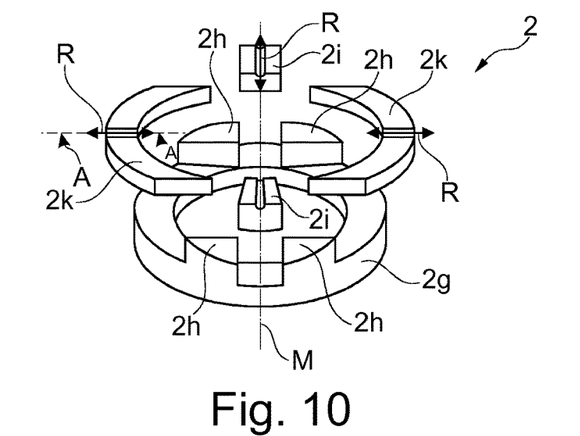
FIG. 10 a perspective view of a multipiece sealing ring.

FIG. 10 shows a multipiece sealing ring 2 comprising a guide part 2g which is endless in the circumferential direction and has side guides 2h, and comprising two narrow sealing segments 2i and two wide sealing segments 2k, which are mounted movably in the radial direction R via the side guides 2h.

FIG. 11 shows a partial view of a longitudinal section through a further piston rod packing 10. In contrast to the arrangement shown in FIG. 2, the arrangement according to FIG. 11 comprises the sealing ring 2 shown in FIG. 10 and also a radial actuator 6. The section through the sealing ring 2, as shown in FIG. 10, runs along section line A-A. FIG. 11 shows in particular that the sealing ring 2 lies via the contact face 2c against the support face 3b of the chamber 3a. The lift-off device 4 comprises a piezo electric actuator 4a and an electric supply line 4b. The wide sealing segment 2k is mounted in the sealing ring 2 so as to be displaceable in the radial direction R. Activation of the actuator 4 creates an intermediate gap Z as shown in FIG. 4. When the intermediate gap Z is open, preferably the guide part 2g of the sealing ring 2 is centered relative to the piston rod 5. The arrangement shown in FIG. 11 comprises at least two radial actuators 6, wherein a respective radial actuator 6 acts on each of the two wide sealing segments 2k in order to displace these in the radial direction R. The arrangement shown in FIG. 11 preferably comprises four radial actuators 6, which are mutually spaced apart in the circumferential direction relative to the piston rod such that each of the four sealing segments 2k, 2i shown in FIG. 10 can be displaced controllably in the radial direction R. Thus the width of the gap S, i.e. the distance between the surface of the piston rod 5 and the inside of the sealing faces 2e of the sealing segments 2k, 2i, is adjustable. There are many possible embodiments of sealing rings 2 which are suitable for an arrangement as shown in FIG. 11, wherein the sealing rings 2 comprise sealing segments 2i, 2k which are displaceable in the radial direction R.

The invention claimed is:

1. A dry-running piston rod packing for sealing a piston rod which is mounted so as to be moveable in a longitudinal direction (L), comprising at least one chamber ring and a sealing ring, wherein the chamber ring has a sealing chamber within which the sealing ring is arranged, wherein the piston rod packing has a high-pressure side and a low-pressure side, wherein the sealing chamber has a support face oriented towards the high-pressure side and delimiting the sealing chamber against the low-pressure side, wherein the sealing ring in the radial direction has an inside and an outside, and wherein the sealing ring has a first and a second end face, wherein the first end face is oriented towards the high-pressure side and forms a pressure application face, and wherein the second end face is oriented towards the low-pressure side and forms a contact face, so that a sealing ring standing under pressure lies with the contact face against the support face, wherein an active lift-off device is configured to lift a sealing ring lying against the support face in the longitudinal direction (L) towards the high-pressure side, in order to form an intermediate gap (Z) between the support face and the contact face of the sealing ring.

2. The piston rod packing as claimed in claim 1, wherein the piston rod packing comprises a plurality of chamber rings and sealing chambers arranged successively in the longitudinal direction (L), wherein a single sealing ring is arranged in each sealing chamber.

3. The piston rod packing as claimed in claim 1, wherein the sealing ring is configured as an endless sealing ring.

4. The piston rod packing as claimed in claim 1, wherein at least two lift-off devices are assigned to each sealing ring, and that the lift-off devices are arranged mutually spaced apart in the circumferential direction of the sealing ring.

5. The piston rod packing as claimed in claim 4, wherein the lift-off device comprises a permanent magnet and an electromagnet, wherein the permanent magnet is arranged in the sealing ring and the electromagnet is arranged in the chamber ring, wherein the permanent magnet and the electromagnet are arranged preferably lying opposite each other in the longitudinal direction (L).

6. The piston rod packing as claimed in claim 4, wherein the lift-off device comprises a pusher part with a pusher face, wherein the pusher face protrudes above the support face in the activated state.

7. The piston rod packing as claimed in claim 4, wherein the lift-off device comprises a piezo crystal, wherein the piezo crystal is arranged in the chamber ring.

8. The piston rod packing as claimed in claim 1, wherein the piston rod packing comprises a radial actuator which is configured to act on the outside of the sealing ring and displaces the entire sealing ring or sealing segments of the sealing ring in the radial direction (R).

9. A method for operating a dry-running piston rod packing for sealing a piston rod which is mounted so as to be moveable in a longitudinal direction (L), wherein the piston rod packing comprises at least one chamber ring and a sealing ring, wherein the chamber ring has a sealing chamber within which the sealing ring is arranged, wherein the piston rod packing surrounds the piston rod, wherein the piston rod packing has a high-pressure side and a low-pressure side in relation to a working gas (G), wherein the sealing chamber has a support face oriented towards the high-pressure side and delimiting the sealing chamber (3a) against the low-pressure side, wherein the sealing ring in the radial direction has an inside and an outside, and wherein the sealing ring has a first and a second end face, wherein the first end face is oriented towards the high-pressure side and forms a pressure application face for the working gas (G), and wherein the second end face is oriented towards the low-pressure side and forms a contact face, so that the sealing ring is pressed with the contact face against the support face in normal operation and lies against this, wherein the sealing ring lying against the support face for centering is first moved by an active lift-off device in the longitudinal direction (L) towards the high-pressure side and thus lifted away from the support face, so that an intermediate gap (Z) is formed between the support face and the contact face of the sealing ring, into which gap the working gas (G) penetrates from the high-pressure side so that the contact pressure force of the sealing ring in the longitudinal direction (L) is reduced in order thus to reduce the friction force to be overcome in order to move the sealing ring in the radial direction (R) relative to the longitudinal direction (L), and that after it has been lifted off, the sealing ring is displaced in the radial direction (R).

10. The method as claimed in claim 9, wherein the sealing ring is lifted and also lowered again during a suction movement of the piston rod.

11. The method as claimed in claim 9, wherein in raised state, the sealing ring is automatically centered by the radial forces acting thereon.

12. The method as claimed in claim 9, wherein the entire sealing ring or sealing segments of the sealing ring in raised state is centered by a mechanically acting radial actuator.

13. The method as claimed in claim 9, wherein the sealing ring is lifted and lowered again once during each complete reciprocating movement of the piston rod.

14. The method as claimed in claim 9, wherein the entire sealing ring or sealing segments of the sealing ring is displaced in the radial direction (R) if the distance between the piston rod and the inside of the sealing ring deviates from a predefined nominal distance value.

* * * * *